United States Patent [19]

Yvard

[11] 4,199,789
[45] Apr. 22, 1980

[54] DOCUMENT ANALYZER IN PARTICULAR FOR A FACSIMILE TRANSMITTER

[75] Inventor: Marcel Yvard, Ollainville, France

[73] Assignee: Compagnie Industrielle des Telecommunications Cit-Alcatel, Paris, France

[21] Appl. No.: 935,292

[22] Filed: Aug. 21, 1978

[30] Foreign Application Priority Data

Aug. 26, 1977 [FR] France ................................ 77 26044

[51] Int. Cl.² ............................................. H04N 1/24
[52] U.S. Cl. .................................... 358/294; 358/213; 358/293
[58] Field of Search ........................ 358/213, 293, 294

[56] References Cited
U.S. PATENT DOCUMENTS 3,867,569  2/1975  Watson ................................ 358/294

OTHER PUBLICATIONS

IBM Technical Disclosure Bulletin, vol. 20, No. 1, Jun. 1977, "Multiple Diode Array Optics", pp. 18-19.
IBM Technical Disclosure Bulletin, vol. 20, No. 1, Jun. 1977, "Optics Alignment", pp. 16-17.

Primary Examiner—Howard W. Britton
Attorney, Agent, or Firm—Sughrue, Rothwell, Mion, Zinn and Macpeak

[57] ABSTRACT

A document analyzer for analying a document along successive analysis lines as the document moves past the generally stationary analyzer. The analyzer illuminates said document along an analysis line, optically a sensor receives the image of the analysis line which is projected onto the sensitive surface of the sensor. In accordance with the invention, an optical element and the sensor are optically aligned and held rigidly in relation to one another by a common rigid support which is stirrup-shaped and with which they constitute a preset optical assembly. Application to transmission of facsimile signals.

5 Claims, 2 Drawing Figures

4,199,789

DOCUMENT ANALYZER IN PARTICULAR FOR A FACSIMILE TRANSMITTER

FIELD OF THE INVENTION

The present invention relates to document analysis by illuminating successive lines of the document (these lines being referred to as analysis lines) and by generating a signal which forms an image of each analysis line by means of a sensor which is sensitive to light coming from respective points of each analysis line.

The present invention relates to a document analyser which operates as stated above and which aims mainly to provide long-term stability in definition.

SUMMARY OF THE INVENTION

The present invention provides a document analyser in a facsimile transmitter, having a housing enclosing means for holding a document and transporting it step by step near the front face of the housing. Means for illuminating the document ensures that successive lines of the document (so called document analysis lines) are illuminated as the document is transported. A line sensor sensitive to the light from each complete successive document analysis line generates an analysis signal from each analysis line, and optical means optically aligned with each other and with the sensor directs and focuses the light from each analysis line into the sensor. The said sensor and the said optical means are rigidly mounted and optically pre-aligned on a common rigid support having a stirrup-iron shape; the support being fixed to the housing and extending substantially perpendicularly from the said front face and having the eye end of the stirrup near to the front face of the housing with the sensor mounted thereon; and having the opposite end, (the tread of the stirrup) with a mirror mounted thereon, said mirror forming part of the optical means and serving to fold the light beam coming from the said analysis line.

Other characteristics and advantages of the present invention will become apparent from the description of an embodiment chosen by way of example and illustrated in the accompanying drawings.

BRIEF DESCRIPTION OF THE DRAWINGS

In these drawings.

DESCRIPTION OF THE PREFERRED EMBODIMENT

Figure 2:
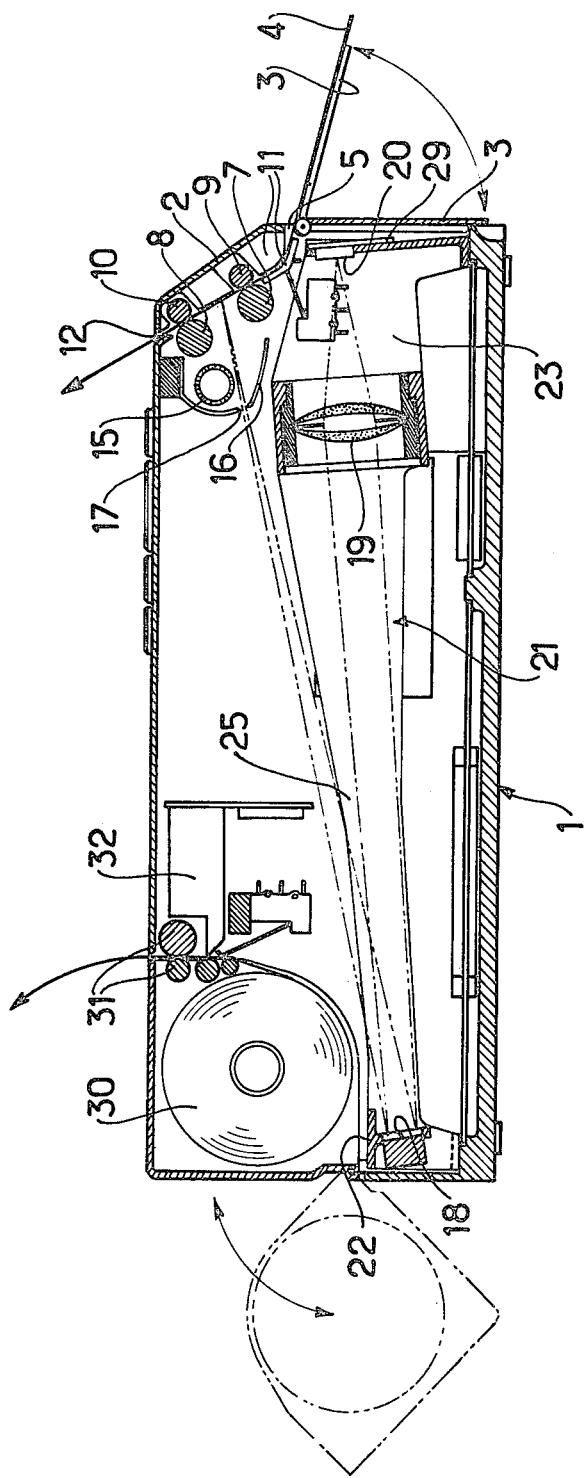

Reference 1 designates the outside housing or covering of a facsimile transmitter. The respective parts of the housing form a stand, a hood, a rear part, a front part and two side surfaces; these parts are not referenced individually. The front part of the device is constituted by an inclined plane portion 2 adjacent to the hood, and by a vertical plane portion 3 adjacent to the stand. This vertical portion 3 is hinged to the lower longitudinal edge of the inclined portion 2. It constitutes a fold-away table flap which is designated by the same reference 3 (as sown schematically in FIG. 2) for inserting a document 4 to be analyzed and for making it pass through a slot 5 between the inclined portion and the vertical portion.

The document is conveyed inside the transmitter by means provided under the inclined portion 2 for guidance, support and step-by-step drive of the document. These means comprise a motor 6 coupled to two rollers 7 and 8 each associated with a pressure roller 9 and 10, respectively. These two roller/pressure roller pairs 7–9 and 8–10 stretch the part of the document situated between them and hence flatten it. Guides 11 are disposed between the slot 5 and a first one 7–9, of the roller/pressure roller pairs to delimit a document-guiding passage for facilitating the insertion of the document between this pair of rollers 7–9. A slot 12 is provided in the hood substantially in the direction of travel of the document between the two roller/pressure roller pairs 7–9 and 8–10 to allow the document to leave the analyser.

The document is stepped by the motor and the two roller/pressure roller pairs, and the analyser illuminates the document along a whole line thereof referred to as an analysis line, while the stepping motor is stopped. The analyser includes a light for illuminating the document along an analysis line, constituted, for example, by a fluorescent tube 15 placed in front of a reflector 16. The reflector reinforces the illumination of the document along an analysis line lying in the part of the document which is situated between the two roller/pressure roller pairs 7–9 and 8–10. The analysis line is illuminated uniformly along its whole length. Advantageously, the supply voltage of the tube 15 will be modulated, at high frequency (100 kHz) so as not to have any interference modulation of the intensity of the incident beam, as this modulation would hinder analysis of the image.

A longitudinal slot 17 in the reflector 16 is provided for the passage of a light beam from the document. This slot 17 is a few millimeters wide: a relatively thin light beam is thus obtained at the output of this slot and the analyser is protected from interference reflections.

The analyser further includes a mirror 18 which receives the light beam coming from the analysis line via the slot 17, a lens 19 and a sensor 20.

These three components—the mirror 18, the lens 19 and the sensor 20—are optically aligned and are rigidly mounted with respect to each other on a common rigid support 21, with which they constitute a pre-adjusted optical assembly. The support 21 is made of metal; it is cast in the shape of a stirrup iron. The support 21 is constituted by: a cross-bar 22 on which the mirror 18 is fixed and a yoke comprising two arms 24 and 25 and an eye 23 which includes aperture open towards the inside of the support and in which the lens 19 and the sensor 20 are housed, the lens 19 being between the mirror and the sensor. The two arms 24 and 25 of the support define between them a space which widens from the eye in a general V-shape for about three quarters of the length of the support, so as to surround the path of the light beam.

This optical assembly 18–21 rests by means of its support on the stand of the housing. The support is substantially as long as the housing and rests on the stand only at the eye and at the cross-bar: the mirror bearing cross-bar rests against the rear part of the housing and is fixed on a support rim of the stand, e.g. by means of screws such as a screw 26 which can be seen in the drawing on one side of the cross-bar; the screw passes through a lateral tab 27 provided on the cross-bar and is screwed into the rim of the stand. The eye which rests against the front part of the housing is fixed similarly on another rim of the stand by means of screws such as a screw 26' which passes through a lateral tab 27' provided on the yoke, at the rear of the eye, and is screwed into said other rim. In the optical assembly 18-21, the mirror 18 placed at the rear of the analyser is slightly inclined in relation to the vertical; its height and its length are such that the light beam which comes from the analysis line and passing through the slot 17 onto the reflector will strike the mirror; it folds the light beam which comes from the analysis line to return it onto the lens 19. The mirror 18, fixed on the cross-bar, can be glued onto the cross-bar or can be held for example by screws.

Like most lenses, the lens 19 has a threaded part (not shown) at both ends; thus, it may be screwed into corresponding tapping provided on the inside wall of the inwardly directed aperture of the eye 23.

The sensor 20 is fixed in the support; it is installed very rigidly in the eye substantially at its end. It is fixed by means of a support plate 29 which closes the end of the eye or it can be fixed directly onto the walls of the eye by means of screws. Without mechanical movement, the sensor analyses all the analysis points of an analysis line of the document whose image is formed on its sensitive surface. Such a sensor is produced by integrated circuit techniques and is of a known type; for example, it may be constituted by the CCD 121 circuit manufactured by FAIRCHILD or by the RL 1728 circuit manufactured by RETICON. It delivers in series signals which correspond to respective analysis points of the document, followed by an end-of-line signal.

Figure 1:
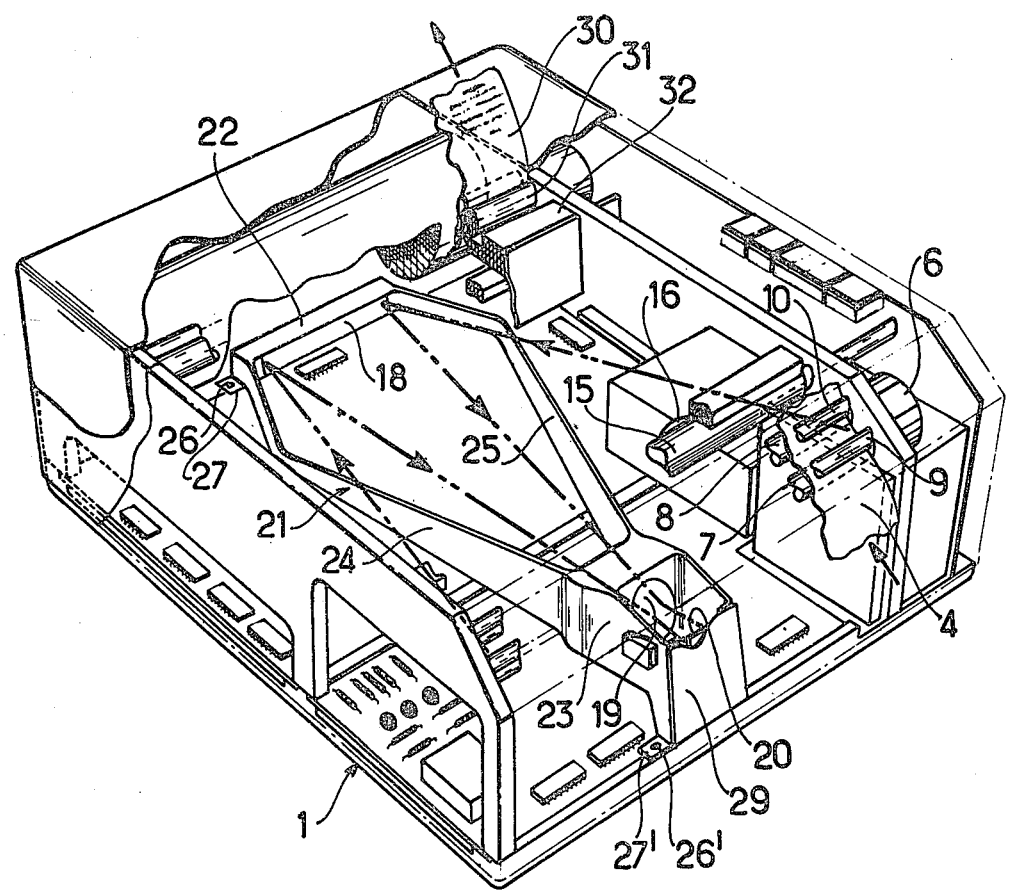
FIGS. 1 and 2 are a perspective view and a cross-section view, respectively of a facsimile transmitter equipped with an analyser in accordance with the invention. In these figures, some components of the transmitter have been omitted or only partially shown so as to illustrate the analyser more clearly. The description given hereinbelow with reference to FIGS. 1 and 2 relates in particular to the analyser and to its arrangement in the facsimile transmitter.

In this optical assembly, the light beam which strikes the mirror 18 and is reflected by it, folding its optical path, passes through the lens 19 and forms the image of the analysis line of the document on the sensitive surface of the sensor 20. The optical path from the analysis line of the document to the sensor is shown in chain-dotted lines in FIGS. 1 and 2.

By way of example, in one embodiment, the lens has a focal length of 50 mm. The reduction ratio between the length of the analysis line of the document and the length of its image formed on the sensor, provided by the lens, is about 9.6. The aperture of the lens is 2.8; the optical distance between the analysis line and the lens is 530 mm; the distance from the lens to the sensor is 55 mm.

The analyser described allows:

a horizontal image definition of 1728 analysis points per analysis line;

an image definition of 3.85 analysis lines per millimeter and an analysis time for one line of 20 ms to be compatible with subsequent processing of the signals in the facsimile transmitter (in particular data compression).

In this analyser it is the rigidity of the support which carries the mirror, the lens and the sensor and prevents them from moving relative to each other, which provides optical alignment of these three components which together with the support constitute an optical assembly that is preset before it is installed in the housing of the facsimile transmitter. Use of the mirror which is installed to reflect the light beam reduces the bulk of this analyser and therefore increases the space available inside the housing for accessory circuits such as logic circuit cards fixed to the stand. This free space also enables easy housing of other extra components in the same housing; these components allow the device to operate alternately as a transmitter or as a receiver. As is apparent from the embodiments shown in FIGS. 1 and 2, it is also seen that there are other components which belong to the device when it operates as a receiver, namely a roll of blank paper 30, guiding and drive means 31 for this paper and a writing head 32 in the housing 1 at the rear of the device and above the support 21.

The present invention has been described hereinabove with reference to the embodiment illustrated in the drawings. It is obvious that without going beyond the scope of the invention, details may be modified and/or some components may be replaced by other technically equivalent components.

I claim:

1. A document analyzer in a facsimile transmitter, said analyser having a housing including a front face and enclosing means for holding a document and transporting it step by step near to said front face of the housing means for illuminating the document to ensure that successive document analysis lines of the document are illuminated as the document is transported, a line sensor sensitive to the light from each complete successive document analysis line to generate an analysis signal from each analysis line, and optical means optically aligned with each other and with the sensor to direct and focus the light from each analysis line onto the sensor, the improvement wherein; said sensor and said optical means are rigidly mounted and optically pre-aligned on a common rigid support having a stirrup-iron shape, said support being fixed to the housing and extending substantially perpendicularly rearward from said front face and having an eye end of the stirrup near said front face of the housing with said sensor mounted thereon, and having the opposite end the tread of the stirrup with a mirror mounted thereon, and said mirror forming part of the optical means and serving to fold the light beam coming from said analysis line.

2. An analyzer according to claim 1, wherein the said stirrup eye end of the support includes an aperture opening towards the interior of the stirrup, and said sensor being located in the aperture.

3. An analyzer according to claim 2, wherein the optical means comprises a lens as well as the said mirror, said lens being located in the aperture together with the sensor in front thereof on the optical path between the mirror and the sensor.

4. An analyzer according to claim 3, wherein side arms constituting the yoke of the stirrup define between them a space which widens from the eye end in a general V-shape for about three quarters of the length of the support.

5. An analyzer according to claim 3, wherein side arms constituting the yoke of the stirrup define between them, a space which widens from the eye end in a general V-shape for about three quarters of the length of the support.

* * * * *